Patented Aug. 11, 1925.

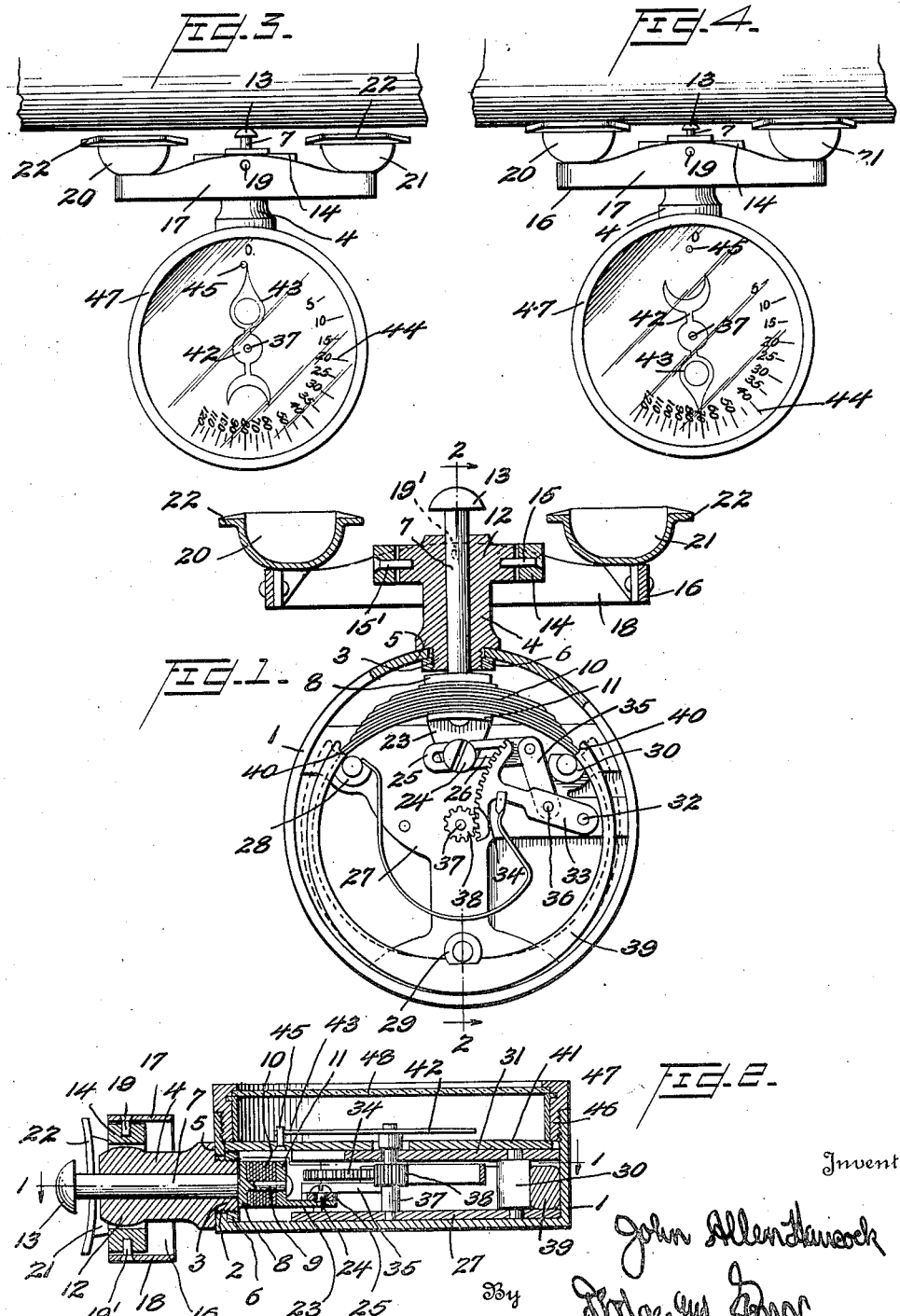

1,549,115

UNITED STATES PATENT OFFICE.

JOHN ALLEN HANCOCK, OF COLUMBIA, SOUTH CAROLINA.

GAUGE.

Application filed July 21, 1923. Serial No. 652,904.

*To all whom it may concern:*

Be it known that I, JOHN ALLEN HANCOCK, a citizen of the United States, residing at Columbia, in the county of Richland and State of South Carolina, have invented certain new and useful Improvements in Gauges, of which the following is a specification.

This invention relates to gauges and has for its particular object to provide a gauge adapted to be used for readily ascertaining the air pressure in pneumatic automobile tires.

Of gauges of this character now in use, there are two general types with one of which the compressed air in the inner tube of the tire acts directly on the mechanism of the gauge, and with the other of which the pressure is determined externally from the hardness of the inner tube.

The objections to the first type of gauge is that before the tire pressure may be ascertained, the valve cap must first be removed and the gauge adjusted in place, always resulting in more or less of loss of air from the tire and consuming the user's time; or, if the gauge is a permanent attachment, it is necessarily of such a size and character as to detract from the general external appearance of the automobile wheel. In the second type referred to, which must necessarily be permanently attached, since this is the only practical way in which the pressure-indicating mechanism can be arranged in contact with the inner tube, the objectionable feature is the presence of mechanism or parts of the gauge between the outer surface of the tube and the tire proper. This results invariably in damage to the inner tube at the point of attachment and further presents additional joints through which dirt and water may gain access to the tube.

The present device is a compact instrument which may be carried without inconvenience in the user's pocket, or kept in the automobile. Its particular object is to provide a handy gauge of this character by means of which the tire pressure may be ascertained by merely placing one end of the gauge against the outer side wall of the tire proper, whereupon the amount of air pressure will be indicated upon the dial of the gauge. Such a gauge as will be readily seen, is intended to eliminate the time required with most gauges now in common use to remove the cap from the valve stem, adjust the gauge on the valve stem to obtain a reading, during which operation a certain amount of air escapes from the tube, and replace the cap. There is also eliminated the possibility of loosing or misplacing the valve stem cap after it has been removed.

The accompanying drawing, wherein the same reference characters indicate like parts throughout the several views, illustrates a practical embodiment of the invention which is now in use.

Figure 1 is a horizontal sectional view of the gauge taken on line 1—1 of Fig. 2, showing in detail the internal mechanism of the gauge and the construction of the tire engaging members thereof;

Fig. 2, a vertical sectional view taken on line 2—2 of Fig. 1;

Fig. 3, a plan view showing the gauge in the position in which it assumes when first placed against the side of the tire; and Fig. 4 a similar view of the gauge after it has been placed firmly against the tire so as to indicate the tire pressure on the dial.

In the drawing 1 represents the casing in which the internal mechanism of the gauge is located. A screw-threaded opening 2 is provided at one side of the gauge in casing 1 in which the externally-threaded reduced end 3 of a tubular stem 4 is secured with its shoulder 5 bearing against the side of the casing. A lock nut 6 on the reduced end of stem 4 within casing 1 serves to firmly secure the stem in place. Mounted for reciprocation in the annular longitudinal opening through stem 4 is a piston or plunger 7. On the inner end of plunger 7, which projects within casing 1, there is rigidly secured a short transversely curved plate 8 from which latter projects in line with the axis of plunger 7, a pin 9. Plate 8 has mounted on its outer face a small leaf spring 10 made up of a series of superposed curved spring-metal leaves of varying lengths increasing in size from that nearest stem 4 outwards towards the center of casing 1. The leaves of spring 10 are perforated centrally to permit the passage of pin 9 after which another curved plate 11, also centrally perforated, is fitted over the projecting end of pin 9. The extremity is then upset so as to rigidly secure together all of the parts just described.

The outer end of plunger 7 projects a short distance beyond the outer transversely enlarged end 12 of stem 4, where it is provided with a head or tire-engaging portion 13. Head 13 is rounded on its outer surface so as not to damage the tire when placed in contact therewith. Enlarged end 12 of stem 4 is rectangular in transverse cross-section and fitted loosely thereover is a rectangular frame member 14, a pair of the opposing sides of which are pivotally connected centrally to portion 12 of stem 4 by means of pivot pins, or other suitable means 15, 15' (see Fig. 1). Fitted loosely over frame 14 is a larger elongated frame member 16, the longer pair of sides 17, 18 of which are pivotally connected centrally thereof by means of pins 19, 19' to the non-pivoted pair of opposed sides of frame member 14 (see Fig. 2). There is thus produced a gimbal-joint or universal connection between frame member 16 and stem 4. To the ends of frame member 16 and on the inner face thereof are rigidly secured a pair of tire engaging members 20, 21, the same being constructed in the form of suction or vacuum cups having their bases connected to frame member 16. Each suction cup 20 and 21, is provided at its rim with a broad flange 22 so as to preclude any possibility of damaging the side of the tire when the gauge is used. Flanges 22 are also curved slightly transversely, as shown clearly in Figs. 1 and 2, so as to conform substantially to the vertical curvature of the side of the tire, whereby a firmer seating of the tire-engaging parts on the tire may be had when the device is used.

Referring again to the parts within casing 1, plate 11 on the inner end of plunger 7 is provided at its lower edge with an outwardly projecting flange 23 having a vertical set screw 24 projecting from the upper face thereof. Rigidly secured to the upper face of flange 23 is a horizontal lever 25. Lever 25 is connected to flange 23 by means of set screw 24, the shank of which extends through a slot 26 in one end of lever 25. Thus lever 25 may be adjusted either along its longitudinal axis on flange 23 or it may be arranged at any desired angle with reference to flange 23 and then secured rigidly in place by means of set screw 24.

Located in casing 1 and secured to the bottom of the same is a lower frame 27 having three upright posts 28, 29 and 30 on the upper ends of which is mounted an upper frame 31. Journalled at its upper and lower ends in upper frame 31 and lower frame 27 is a vertical arbor or shaft 32. Intermediate the ends of shaft 32 there is rigidly connected at its inner end a horizontal arm 33 on the outer end of which is a toothed segment 34. A horizontal lever 35 is pivotally connected at one end to the outer end of lever 25 and at its opposite end to lever 33 at 36. Located in the center of casing 1 and also having bearings in upper frame 31 and lower frame 27 is a vertical arbor or shaft 37 on which there is fixedly mounted a gear 38. Gear 38 meshes at all times with the toothed segment 34 on the outer end of lever 33. Between frames 27 and 31 there is provided a U-shaped spring-metal member 39. U-shaped member 39 extends between posts 28, 29 and 30 and the vertical wall of casing 1 between which and post 29 it is rigidly secured in place. Member 39 is thickened at its base, while the arms thereof gradually taper down until at their extremities they are comparatively thin. These extremities of spring-metal member 39 are each notched or provided with a groove 40 with which the extremities of the outermost leaf of spring 10 engage.

On the upper face of frame 31 and below the upper edge of casing 1, there is secured against movement an annular dial 41 having a central opening therein through which projects the upper end of arbor or shaft 37. On this end there is fixedly mounted a hand 42 having a pointer 43 on one end thereof by means of which the tire pressure is indicated in conjunction with the graduations 44 on the dial. An upright stop-pin 45 on the outer face of dial 41 indicates the "zero" point on the dial and serves to limit the retrograde movement of the hand 42 after a reading has been taken.

On its inner periphery above dial 41, casing 1 is screw-threaded to receive the externally threaded depending flange 46 provided on ring member 47 in which is suitably mounted a glass covering 48. Flange 46 is of such depth that when screwed sufficiently far down it will clamp dial 41 and the underlying parts of the mechanism firmly in place within casing 1.

In use, the gauge is placed with the outer extremity or contacting head 13 of plunger 7 against the side of the automobile tire, with the gauge as near perpendicular as possible to the portion of the tire with which it contacts. The plunger 7 is then pressed firmly against the tire moving it inwardly through tubular member 4, until cups 20, 21 come firmly into contact with the side of the tire. As the result of the inward movement of plunger 7, the mechanism within casing 1 will be actuated as hereinbefore described to cause the movement of hand 42 above the dial 41, the inward movement of plunger 7 being resisted by leaf spring 10 and U-shaped spring member 39 against the extremities of which bear the ends of the outermost leaf of spring 10. According to the hardness or softness of the tire, which depends upon the amount of air pressure, pounds per square inch, therein, the tire contacting extremity or head 13 of plunger 7 will move a greater or lesser amount towards the plane of contact of the tire-engaging surfaces of cups 20, 21, resulting in a lesser or greater rotation of hand 42 in a clockwise direction above the graduations. The universal mounting of the tire-contacting cups 20, 21 on the gauge is for the purpose of permitting these members to readily accommodate themselves to and firmly engage with the side of the tire.

The spaces between the graduations 44 on dial 41 will decrease progressively from the zero point up to the maximum pressure indicia, as will be readily understood, since the location of the pressure indicia will be determined by first calibrating the instrument according to known pressures within the tire.

Thus it will be seen that by merely placing the contacting surfaces of the gauge firmly against the side of the tire the air pressure therein may be quickly and easily ascertained.

It is not intended that the present invention shall be restricted to the exact construction shown, since various changes may be made therein.

What I claim is:

1. A gauge, adapted to be applied externally to a pneumatic tire to determine the air pressure therein, comprising in combination, a casing having a tubular extension projecting therefrom, a plunger mounted for reciprocation in said extension, said plunger projecting beyond the outer end of said extension, a pair of tire-engaging members disposed on opposite sides of said plunger and having a universal connection with said casing extension, said tire-engaging members being disposed substantially in a single plane beyond which extends the outer end of said plunger, a dial in said casing having graduations thereon, an indicating hand mounted for rotation above said dial, operative means connecting the inner end of said plunger and said hand for causing rotation of the hand upon inward movement of said plunger, and spring means within the casing for opposing inward movement of the plunger.

2. The combination in a portable gauge adapted to be applied to the external surface of a pneumatic tire, of a casing, a reciprocable plunger mounted in said casing and having an outer tire-engaging extremity projecting therefrom, tire-engaging means provided on said casing beyond the engaging surface of which normally projects the outer tire-engaging extremity of the plunger, means within said casing for urging said plunger towards its normal position, and means within the casing for indicating the hardness or softness of the tire, said means being connected to and actuated by said plunger when the plunger is pressed against a tire until said tire-engaging means engages the tire.

3. A portable gauge adapted to be applied to the external surface of a pneumatic tire for determining the relative hardness or softness of the tire, depending upon the air pressure therein, comprising a casing, a reciprocable plunger having a tire-engaging extremity projecting therefrom, spring means for urging said plunger outwardly, fixed tire-contacting means beyond the engaging surface of which the outer extremity of the plunger normally projects, and means within the casing for indicating the relative hardness or softness of a tire according to the relative location of the outer extremity of the plunger when the plunger is pressed against the tire until said fixed tire-engaging means contact with the tire.

4. The combination in a gauge, adapted to be applied externally to a pneumatic tire to determine the air pressure therein, of a casing, a reciprocable member mounted in said casing, and having an outer tire-engaging extremity projecting therefrom, tire-engaging means mounted for universal movement on said casing beyond the engaging surface of which normally projects the outer tire-engaging extremity of the reciprocable member, means for urging said reciprocable member towards its normal position, and means within the casing for indicating the hardness or softness of the tire, said means being connected to and actuated by said reciprocable member when the member is pressed against a tire until said tire-engaging means engages the tire.

In testimony whereof I have signed my name to this specification.

JOHN ALLEN HANCOCK.